Figure 1:
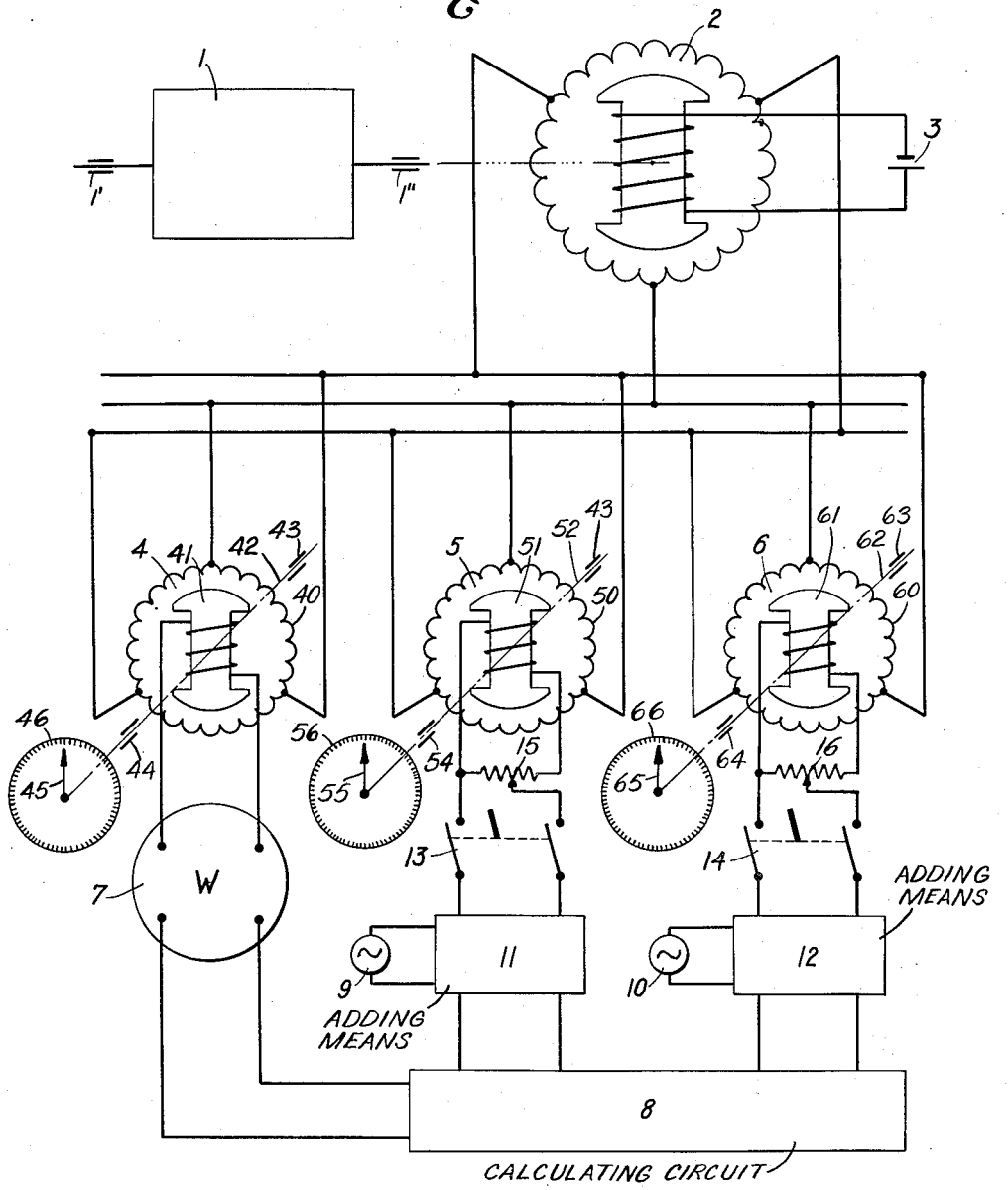

CALCULATING CIRCUIT

INVENTORS
Jaroslav Němec, Ludvík Kuhn
BY

INVENTOR.
JAROSLAV NĚMEC & LUDVÍK KUHN
BY
AGENT.

United States Patent Office 2,966,801
Patented Jan. 3, 1961

2,966,801

DEVICE FOR CENTRAL CONTROL OF A WATT-METRIC BALANCING SYSTEM

Jaroslav Němec, 10 Boleslavska, and Ludvík Kuhn, 14 DeJvicka, both of Prague, Czechoslovakia Filed Jan. 24, 1957, Ser. No. 636,079

Claims priority, application Czechoslovakia Feb. 13, 1956

2 Claims. (Cl. 73—462)

The present invention relates to a device for central control of a wattmetric balancing system, and in particular is directed to a device for effecting dynamic balancing of rotors of high speed machines by employing the wattmetric method.

It is a well known fact that a wattmetric system is one of the most advantageous means for dynamically balancing rotors, particularly of high speed machines, for the purpose of increasing their specific performance.

In accordance with the wattmetric method one of the coils of a sensitive wattmeter is supplied with an adjusted voltage from an electrical vibration pick-up, placed preferably in the proximity of both bearings of the revolving rotor, whereas the other coil of the wattmeter is fed with the voltage from an auxiliary generator producing a harmonic or sinusoidal voltage with a phase adjustable according to requirements. The rotatable stator of the auxiliary generator is provided with a scale permitting the reading of the phase of vibrations or of the unbalance.

However, vibrations in the bearings do not occur only by reason of an unbalanced rotor. In addition to vibrations having a frequency identical with the rotational speed of the rotor, the electric pick-ups are influenced also by vibrations having higher frequencies, caused in particular by the roller bearings or the like. When examining the unbalance of the rotor as far as its magnitude and phase are concerned, only that voltage which is proportional to the unbalance, has to be filtered out by means of a sensitive wattmeter from the actual voltage generated by the pick-ups. It is therefore imperative that the current flowing through the other coil of the wattmeter should follow a harmonic, that is, sinusoidal function with a constant amplitude, because in this case, as is known, the indication of the wattmeter determined by the scalar product of the vectors of current flowing through both coils is actually proportional to the magnitude of that voltage from the pick-up which has a frequency identical with the rotational speed of the rotor, multiplied by the cosine of the phase shift.

The hitherto designed apparatus for dynamic balancing by the wattmetric method are characterised by the following features:

The auxiliary generator of the harmonic or sinusoidal voltage is connected by a resilient clutch to the shaft of the rotor to be balanced. The stator of the auxiliary generator is rotatable and usually provided with a suitable scale. By rotating the stator during the measurement, the phase position of the vector of the oscillation or unbalance of the rotor may be determined in such a way as to make the indication of the wattmeter equal to zero. At a zero deflection of the wattmeter the sensitivity has its maximum value.

During the entire operation of balancing the rotor, a compensation—i.e. a so-called electric balancing of the rotor—has often to be carried out particularly in order to determine the influence of an experimental unbalance of a known value and known position. Such electric balancing is carried out in the existing devices by compensating the output voltages of vibration pick-ups by means of standard harmonic voltages obtained from further auxiliary generators of harmonic voltage which are also connected to the shaft of the revolving rotor. Since it is necessary to change not only the phase but also the amplitude of the auxiliary voltages, the existing devices require a relatively intricate wiring, comprising for example, four-poles with electronic tubes, switches, condensers and potentiometers. A change of such standard voltages from the auxiliary generators can be accomplished only with considerable difficulty, because a change of the phase affects the amplitude and, conversely, a change in amplitude affects the phase, so that the adjustment of the auxiliary voltages requires several repetitions and corrections of the entire process to achieve the required accuracy.

A further important drawback of the hitherto used devices is the fact that, when measuring the phase and the value of the unbalance, the stator of the auxiliary generator has to be rotated so as to pass from the zero deflection of the wattmeter to a maximum deflection and from a maximum deflection to zero deflection.

Since the measuring apparatus is usually disposed a considerable distance from the rotor to be balanced, one operator has to manipulate the rotatable stators, while another operator is occupied at the measuring table. Even if perfect harmony between both workers is established, unsatisfactory, even faulty measurements are not a rare occurrence.

A substantial improvement in the application of the wattmetric balancing systems is achieved by the present invention, which permits central control of the entire system. The essence of the invention resides in inducing in the auxiliary generator, during the rotation of the rotor, a three-phase voltage of a fixed phase and amplitude, which is received in controllable transformers or receivers provided in the measuring apparatus itself, the emitted three-phase voltage being transformed in the transformers or receivers into suitable auxiliary harmonic voltages used for feeding the second coil of the wattmeter and for the purpose of compensation or electric balancing.

Consequently, the entire balancing system may be controlled from one point by one operator only, who, while following the indications of the wattmeter, may at the same time conveniently effect all changes in the amplitude and phase of the auxiliary voltages. The speed and accuracy of the measurement is thus considerably increased.

A further advantage of the device according to the invention is to be seen in the fact, that when effecting the compensation or electric balancing of the rotor, the change of the phase and the change of the amplitude of the auxiliary voltage are entirely independent from each other and there is, therefore, no need to repeat the operation in order to render it more accurate, as in the existing apparatus.

Finally there is another advantage of the device according to the invention. The design of the compensating circuits is considerably simplified, there being no need to use some of the control members such as four-poles with electronic tubes and switches, which are indispensable in the hitherto used devices.

Figure 2:
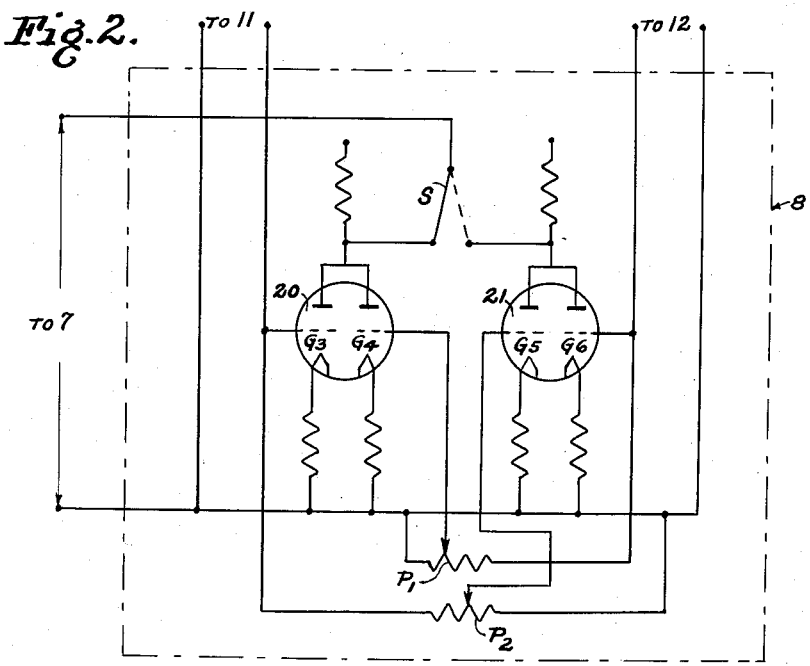
Figure 3:
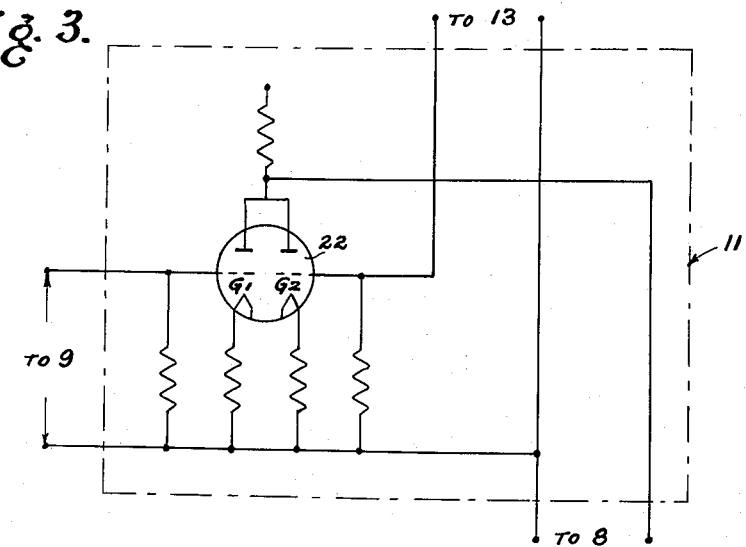

The principle of the invention will appear more clearly from the following detailed description of an illustrative embodiment which is to be read in connection with the accompanying drawing, wherein:

Fig. 1 is a schematic diagram of a balancing device embodying the invention; and Figs. 2 and 3 are wiring diagrams of elements represented schematically in Fig. 1.

Resiliently connected to the shaft of a rotor 1 to be balanced, mounted for rotation in bearing 1' and 1", is a three-phase generator 2, representing a transmitter with a closed circular stator winding and a two-pole rotor fed by direct current from a battery 3.

The generated magnetic rotating field induces in the circular stator winding a three-phase voltage of a frequency identical with the revolutions of the rotor 1 and the phases of which are shifted through 120°. This voltage is fed to the measuring apparatus itself, which may be placed at any desired distance from the rotor 1 and generator—transmitter 2.

In the measuring apparatus itself, three control transformers or receivers 4, 5 and 6 are provided, each of which is similar in arrangement to the transmitter 2. Thus, the receivers 4, 5 and 6 are provided with closed circular stator windings 40, 50 and 60, respectively, and two-pole rotors 41, 51 and 61, respectively, secured against spontaneous rotation. The stator windings 40, 50 and 60 of the receivers 4, 5 and 6, respectively, are connected in the same way, that is, either in a triangle as shown in the drawing or in a star, to a three-phase line from the stator of the transmitter 2.

Magnetic rotating fields are therefore generated in the receivers 4, 5 and 6, such fields inducing harmonic voltages in the windings of the two-pole rotors 41, 51 and 61, respectively, the frequency of the harmonic voltages being also identical with the revolutions of the rotor 1. The phases of these so called "standard" voltages induced in the windings of rotors 41, 51 and 61 may, however, be easily changed, as the shafts 42, 52 and 62 of the rotors of the receivers 4, 5 and 6, respectively, which are journalled in bearings 43 and 44, 53 and 54, and 63 and 64, extend from the panel of the measuring table and are provided with rotatable knobs 45, 55 and 65 bearing pointers cooperating with scales 46, 56 and 66 indicating from zero to 360°, so that by means of such knobs the rotors of the receivers 4, 5 and 6 may be rotated to any desired fixed position.

The first receiver 4 serves for the proper measuring by means of the wattmeter 7. The harmonic or sinusoidal component of the voltage induced in the winding of rotor 41 is brought to the required phase by rotating the rotor of the receiver 4 to a suitable position. This voltage is then fed to one of the coils of the wattmeter 7 in order to ensure the selectivity of the measurement and to filter off those frequencies which differ from the rotational speed of the rotor 1, when measuring undesirable vibrations, as mentioned above. The other coil of the wattmeter is supplied with a voltage from a conventional calculating circuit 8, such voltage representing the mathematical result of functions obtained from the pulses supplied by vibration pick-ups 9 and 10, arranged in the vicinity of bearings 1' and 1" and suitably amplified by amplifiers and adding means 11 and 12. As shown in Fig. 2, the calculating circuit 8 may comprise two double electronic tubes 20 and 21 having grids $G_3$ and $G_4$ and grids $G_5$ and $G_6$, respectively, and two potentiometers $P_1$ and $P_2$. The voltage from the adding means 11 is led to the grid $G_3$ of tube 20, while the voltage from the other adding means 12 is led to the grid $G_4$ of the same tube 20 by way of the potentiometer $P_1$. Similarly, the grid $G_5$ of the tube 21 is connected to the adding means 11 through the potentiometer $P_2$, while the other grid $G_6$ of the tube 21 is connected to the adding means 12. A two way switch S is interposed between the anodes of tubes 20 and 21 and the wattmeter 7 so that the anodes of the tubes 20 and 21 can be alternatively connected to the wattmeter. Thus, with the switch S in the position illustrated in full lines, a voltage is supplied to the moving coil of wattmeter 7 which is proportional to the sum of the voltage from adding means 11 and any fraction of the voltage from adding means 12. On the other hand, when the switch S is manipulated to the broken line position of Fig. 2, a voltage is supplied to the moving coil of the wattmeter which is proportional to the sum of the voltage from adding means 12 and any required fraction of the voltage from adding means 11

Referring now to Fig. 3, it will be seen that the adding means 11 may consist of a double electronic tube 22 having two grids $G_1$ and $G_2$, with the electric pulses from pick-up 9 being fed to grid $G_1$, and with a voltage being fed to the grid $G_2$ from a control device 15 by way of a switch 13. The anodes of the tube 22 are connected together so that, at the interconnected anodes, a voltage is obtained that is proportional to the sum of the voltages received from the pick-up 9 and the control device 15, respectively, and such voltage is supplied to the calculating circuit 8, as described above. The adding means 12 may be identical to the above described adding means 11 and thus includes a double electronic tube (not shown) having two grids which respectively receive voltages from the pick-up 10 and from a control device 16 by way of a switch 14, while the sum voltage at the interconnected anodes of the tube is fed to the calculating circuit, as described above. Switches 13 and 14 are open during measurement of the undesirable vibrations. The phase of the unbalance is ascertained at the zero deflection of the wattmeter 7 and its size at the maximum deflection.

The two further receivers 5 and 6 serve for effecting compensation or electric balancing, which is usually accomplished before the measurement itself. After the switches 13 and 14 have been closed, the pulses from the pick-ups 9 and 10 may be compensated by a harmonic voltage induced in the windings of rotors 51 and 61 of the receivers 5 and 6. During this operation the phase of these voltages is changed by revolving the rotors, and the amplitude is changed by means of the control devices 15 and 16 which may be in the form of simple potentiometers, as shown, so as to reduce to zero the voltages on the output terminals of the adding means 11 and 12. The compensation of vibrations caused by the unbalance in both bearings 1' and 1" of the rotor may in this way be achieved.

The present invention may be regarded as involving two basic aspects. As noted above, one aspect relates to measuring and the other to compensation. The measuring (or proper measuring) aspect relates to the ascertainment of the phases and amplitudes of those vibrations which are attributable to the unbalance of a rotating body, which measured phases and amplitudes are respectively proportional to the position and mass of the unbalance. During the proper measuring the switches 13 and 14 are open and, as a result, the receivers 5 and 6 are disconnected from the wattmeter unit 7. There is supplied to one coil of the unit 7 a sine wave voltage from the receiver 4 and to the other coil thereof a sum of arbitrarily chosen proportions of the voltages from the vibration pick-up units 9 and 10. The wattmeter 7 indicates the product of the amplitudes of the two voltages multiplied by the cosine of the angle of the phase shift therebetween. The sine wave voltage from the receiver 4 can be altered in phase but not in amplitude. The phase is controlled by turning the shaft 42 of the rotor 41 in its bearings 43 and 44, and the phase angle can be read by means of the pointer 45 and the scale 46.

The voltage applied to the other coil of the wattmeter unit 7 from the calculating circuit 8 may be proportional either to the vibrations near the bearing 1' or near the bearing 1" or to the vibrations in any chosen vertical correction plane between the bearings 1' and 1". The unit 7 will indicate no current when the cosine of the phase shift between the voltages applied to the two coils is zero. At such time the voltage from the receiver 4 is in phase with the voltage from the circuit 8, which phase is that of the vibrations. The phase of the vibrations in turn gives an indication of the position of the unbalance in the chosen correction plane. Having noted the unbalance phase, the shaft 42 of the receiver 4 is then turned by 180 degrees to obtain the maximum reading of the wattmeter unit 7. This maximum reading indicates the amplitude of the vibrations under consideration or the size of the unbalance mass in the chosen correction plane.

The compensation aspect involves bringing the apparatus to such a state that the rotor 1 is virtually or electrically balanced. In other words, a unit mass will then influence the measuring apparatus in exactly the same way as it would influence a balanced rotor. To determine this influence, called the influence factor of a given rotor, is necessary if it is desired to determine the needed balance weight and its position by direct calculation rather than by a trial and error method. Knowing the influence factor for a chosen correction plane, and having measured the unbalance as described above, the needed mass, its radius and its angle position, to bring about a dynamic balance of the rotor 1, may be readily calculated.

To obtain the influence factor for a chosen correction plane, that is, to determine the effect of a unit mass at a unit radius in the correction plane, it is necessary to virtually balance the rotor and the measuring apparatus. This may be done by matching the voltages from the pick-up units 9 and 10 against sine wave voltages of auxiliary receivers, so that the resultant voltage from each of these matchings is zero. More specifically, the voltage output of the pick-up unit 9 is matched in the circuit 11 against the voltage from the receiver 5. The phase of the voltage from the receiver 5 may be shifted by turning the rotor 51 and the shaft 52 and the amplitude thereof may be changed by adjusting the potentiometer 15. If the voltage from the switch 13 is of the same amplitude and exactly opposite phase of that from the pick-up unit 9, the output of the circuit 11 will be zero. Similarly, that from the circuit 12 is zero when the voltage of the pick-up unit 10 and that from the switch 14 are matched in the same way. The rotor 1 is then virtually or electrically balanced.

The mode of operation of a specific illustrative embodiment of this invention, to obtain the necessary data for calculating the size and position of the needed balance weight may advantageously be as follows:

*First step.*—With the switches 13 and 14 open and the potentiometers $P_1$ and $P_2$ adjusted so as to have no voltage on the grids $G_4$ and $G_5$ of the tubes 20 and 21, the amplitudes and phases of the vibrations coupled to the pick-up units 9 and 10 are measured by respectively varying the position of the switch S of the circuit 8. The amplitudes of the vibrations are determined with the aid of the wattmeter unit 7 and the phases by turning the rotor 41 of the receiver 4 and noting the angle on the scale 46 when the wattmeter 7 indicates zero. Then, the switches 13 and 14 are closed, the calculating circuit 8 is connected only to the adding circuit 11 and, by employing the wattmeter 7 as an indicator, the compensation or matching of the pick-up unit 7 is completed. In other words, there is coupled to the circuit 11 by way of the switch 13 from the receiver 5 a voltage of such amplitude and phase as to compensate the voltage from the pick-up unit 9. The amplitude of this compensating voltage is adjusted by varying the potentiometer 15 and the phase thereof is adjusted by turning the rotor 51 of the receiver 5. Similarly, the voltage output of the pick-up unit 10 is compensated or balanced by coupling to the circuit 12 by means of the switch 14 a voltage from the receiver 6, the amplitude of which voltage may be controlled by the potentiometer 16 and the phase of which may be adjusted by turning the rotor 61 of the receiver 6. The compensation of the outputs of the pick-up units 9 and 10 having been completed, the output of each of the circuits 11 and 12 will of course be zero.

*Second step.*—A known unbalance such as, for example, a unit mass, is fixed in position in a first correction plane, thereby altering the vibrations of the bearings 1' and 1'' and the voltage outputs of the pick-up units 9 and 10. At the output terminals of the circuits 11 and 12 there will then appear, the compensation having been completed as described above, unbalance voltages which are proportional only to the known unbalance weight and not to the actual unbalance state of the rotating member 1. These unbalance voltages are measured, as described above, by means of the switch S, the wattmeter unit 7 and the receiver 4.

*Third step.*—The known unbalance is then transferred to a second correction plane. The voltage outputs of the pick-up units 9 and 10, which voltages are again changed, are then measured. The unbalance voltages measured in the second and third steps characterize the rotating member which is to be balanced. These voltages are proportional to the influence factors which are utilized to calculate the mass and position of the weights to be added to the rotating member to dynamically balance it.

It is noteworthy that apparatus made in accordance with the principles of this invention makes possible the removal of the influence of one correction plane on the may be done by means of the potentiometer $P_1$ of the circuit 8; with the switch S arranged in its first position, as shown in Fig. 2, the potentiometer $P_1$ is adjusted during the third step to make the indication of the wattmeter unit 7 zero.

*Fourth step.*—With the known unbalance weight in position in the first correction plane and the switch S in its second position, the potentiometer $P_2$ is adjusted to make the indication of the wattmeter unit zero.

The advantages of the present invention may be briefly summarized as follows:

(a) All control members are concentrated at one place and may conveniently be operated by a single operator.

(b) The three phase generator 2 connected with the rotor 1 to be balanced, may be placed at a rather inaccessible place.

(c) The accuracy of reading is increased and the operation accelerated, as the adjustment of the phase and amplitude of the voltage is carried out with simultaneous observation of the wattmeter.

(d) The compensation or electric balancing of the rotor is very easy to achieve, the changes of amplitude and changes of phase of the harmonic voltages being entirely independent from each other.

(e) The device according to the invention is simpler than the hitherto used apparatus, as some of the control members previously required in the compensating circuits are dispensed with.

We claim:

1. In combination in an apparatus for balancing a rotating member, three-phase voltage-generating means coupled to said rotating member for providing a voltage output whose frequency is equal to the rotational speed of said member, said generating means including an output winding, first receiver means including a three-phase stator winding connected to the output winding of said voltage-generating means and also including a rotor having a winding thereon, which rotor is selectively rotatable so that the phase of the voltage induced in said rotor winding is adjustable, a wattmeter having first and second coils, said first coil being connected to the rotor winding of said first means, pick-up means responsive to vibrations of said rotating member for providing voltages which are proportional to said vibrations, first means for applying said voltages to the second coil of said wattmeter, second and third receiver means each including a three-phase stator winding connected to the output winding of said voltage-generating means and also including a rotor having a winding thereon, which rotor is selectively rotatable so that the phase of the voltage induced in said rotor winding is adjustable, and second means including switching means and voltage amplitude adjusting means coupled to the rotor windings of said second and third receivers for applying to said first applying means voltages whose phases and amplitudes may be adjusted to exactly balance out the voltage outputs of said pick-up means, so that said rotating member may thereby be electrically balanced.

2. A combination as in claim 1 wherein said first applying means includes adding means and calculating means, said adding means being connected between said pick-up means and said calculating means, the output of said calculating means being connected to the second coil of said wattmeter.

References Cited in the file of this patent

UNITED STATES PATENTS

| | | |
|---|---|---|
| 2,243,379 | Johnson | May 27, 1941 |
| 2,359,158 | Rushings et al. | Sept. 26, 1944 |
| 2,362,842 | Mueller | Nov. 14, 1944 |
| 2,678,558 | Pischel | May 18, 1954 |
| 2,796,600 | Church | June 18, 1957 |
| 2,805,576 | Rambo | Sept. 19, 1957 |

FOREIGN PATENTS

| | | |
|---|---|---|
| 735,802 | Great Britain | Aug. 31, 1955 |